United States Patent
Kadowaki

[15] 3,669,383
[45] June 13, 1972

[54] MOVIE PROJECTOR ADAPTED TO USE BOTH A FILM CARTRIDGE AND AN OPEN REEL

[72] Inventor: Tatsusuke Kadowaki, Kanagawa, Japan
[73] Assignee: Kabushiki Kaisha Ricoh, Tokyo, Japan
[22] Filed: Dec. 14, 1970
[21] Appl. No.: 97,651

[30] Foreign Application Priority Data

Dec. 19, 1969 Japan..............................44/102774

[52] U.S. Cl..............................242/192, 242/181, 242/197, 242/205, 352/73
[51] Int. Cl......................................................G03b 23/02
[58] Field of Search..................242/192, 195, 197, 198, 205, 242/207, 210, 208, 186, 189, 190, 180, 181; 352/157, 158, 72, 73, 78

[56] References Cited

UNITED STATES PATENTS

| | | | |
|---|---|---|---|
| 3,386,675 | 6/1968 | Thomsen | 242/198 X |
| 3,552,683 | 1/1971 | Bundschuh | 242/205 X |

*Primary Examiner*—George F. Mautz
*Attorney*—John J. McGlew and Alfred E. Page

[57] ABSTRACT

A movie projector has a reel support arm mounted in its housing for movement between a retracted, film cartridge attaching position and a projected reel mounting position, and has a film feed spindle adjacent its outer end. A film stripper pawl and a film threader are cooperable with film in a cartridge attached to the support arm to feed the film automatically to a film gate, and are connected to a driving means by operating mechanism including a clutch. A control mechanism for the clutch is operated, responsive to movement of the support arm to its projected position, to disengage the clutch means and maintain the clutch means disengaged while an open reel is mounted on the projected reel support arm.

5 Claims, 12 Drawing Figures

INVENTOR
TATSUSUKE KADOWAKI
BY
McGlew & Tuttle

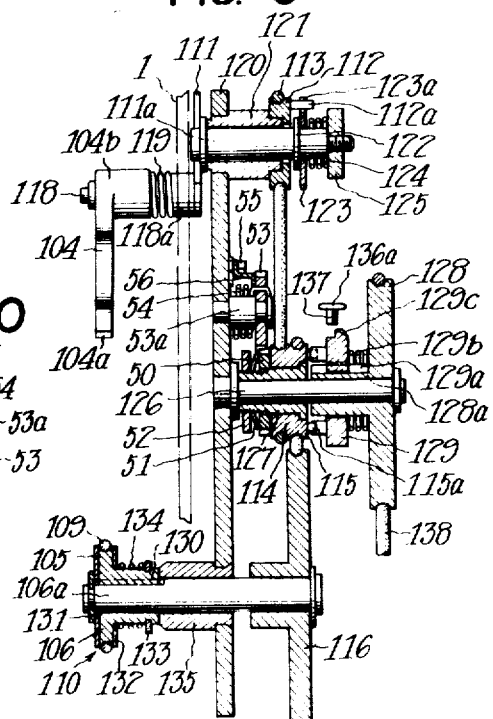
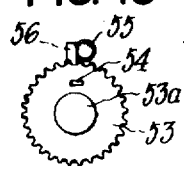
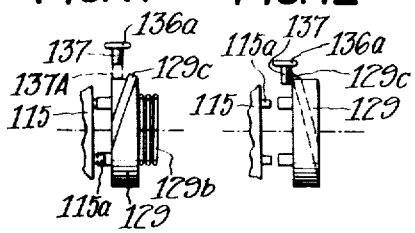

3,669,383

1

MOVIE PROJECTOR ADAPTED TO USE BOTH A FILM CARTRIDGE AND AN OPEN REEL

BACKGROUND OF THE INVENTION

In small movie projectors adapted to use a film cartridge, such as an 8mm film projector adapted to use a cartridge for super 8 film manufactured by Eastman Kodak Company, the film is fed automatically to the film gate by a film stripper pawl and a threader which are rendered operative when a film cartridge is mounted, in a manner described hereinafter. Movie projectors of this type may be provided with means adapting them to use an open reel as well as a film cartridge, and such means may comprise a movable reel support arm which can be moved between an open reel attaching position, for supporting an open reel, and a retracted film cartridge attaching position. When the support arm is moved to the projected open reel attaching position, the film is manipulated manually and passed between the film stripper pawl and the threader for insertion into the film gate. Under these conditions, difficulty is experienced in threading the film if the film stripper pawl and the threader are in operative positions, because these elements are brought into contact with each other when in the operative positions.

SUMMARY OF THE INVENTION

This invention relates to small movie projectors adapted to use both in a film cartridge and an open reel and, more particularly, to such a movie projector provided with means for rendering a film stripper pawl and a threader inoperative responsive to movement of a reel support arm to a projected open reel attaching position.

In accordance with the invention, the support arm is provided, adjacent its inner end, with an abutment or the like which, when the support arm is moved to its projected position for attaching an open reel thereto, engages a lever and pivots this lever. The pivoting of this lever operates a clutch control mechanism to disengage a clutch included in operating mechanism connecting a film stripping pawl and a film threader to driving means. Thereby, the film stripper pawl and the film threader are automatically rendered inoperative responsive to movement of the reel support arm to the projected open reel attaching position.

An object of the invention is to provide an improved movie projector adapted to use both a film cartridge and an open reel.

Another object of the invention is to provide such a movie projector in which a film stripper pawl and a film threader are rendered inoperable responsive to movement of a reel support arm to a projected open reel mounting position.

A further object of the invention is to provide such a projector in which the support arm, in moving to the projected position, operates lever means effecting disengagement of a clutch included in operating means for a film stripping pawl and a film threader.

For an understanding of the principles of the invention, reference is made to the following description of a typical embodiment there of as illustrated in the accompanying drawing.

2

Figure 1:
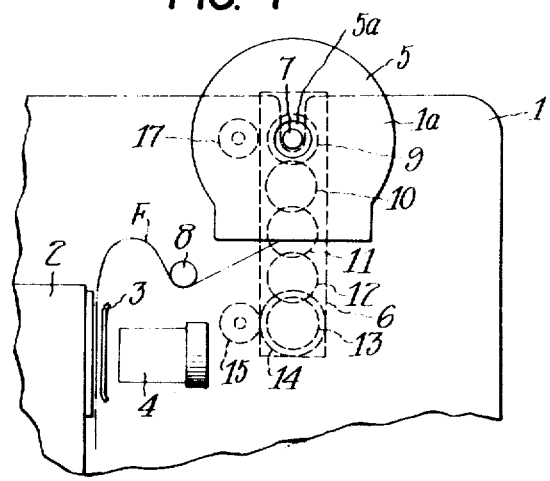
FIG. 1 is a fragmentary side elevation view of a small movie projector embodying the invention, and illustrating the projector with a film cartridge mounted therein.
Figure 2:
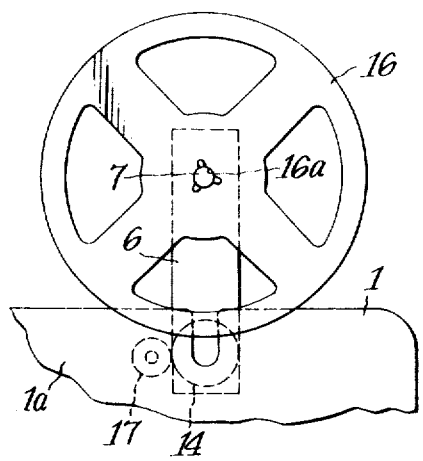
FIG. 2 is a view similar to FIG. 1, but illustrating the projector with an open reel mounted thereon.
Figure 6:
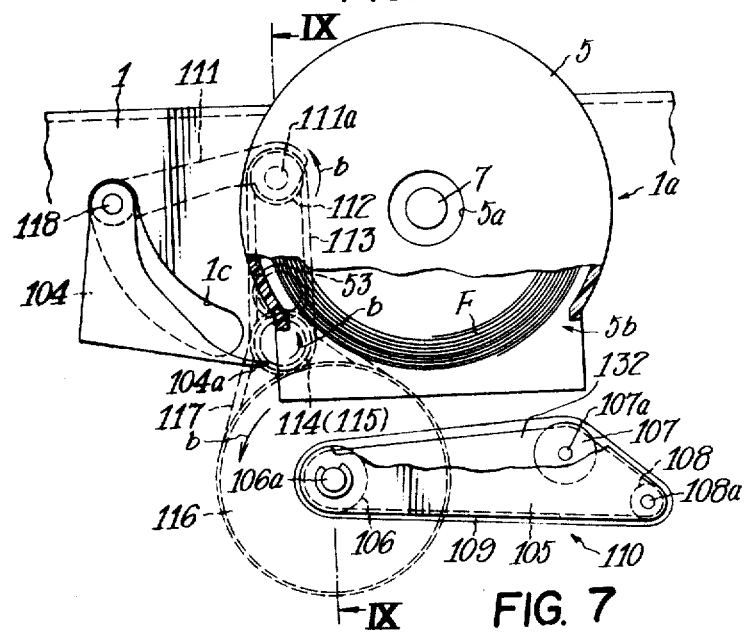
Figure 7:
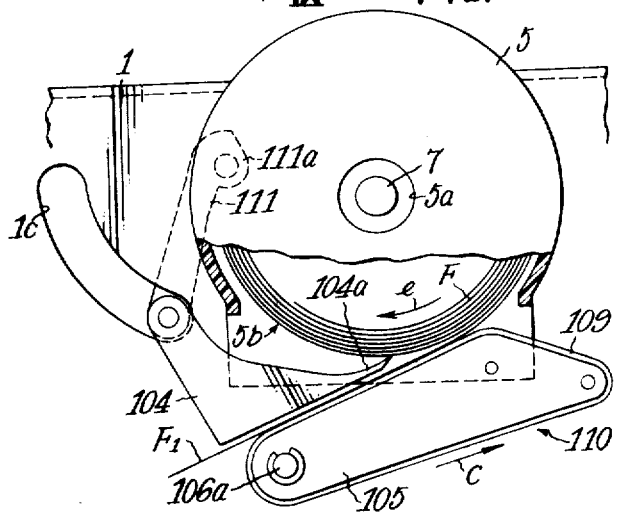
Figure 8:
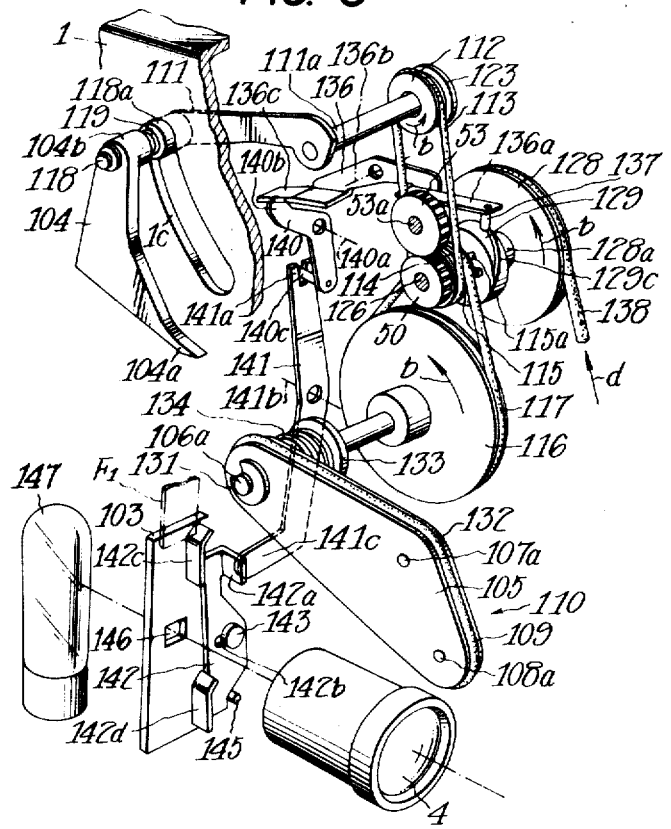

FIG. 6 is a side elevation view, partly in section, of an automatic film feed device of the projector shown in FIGS. 1 and 2, with the device being illustrated in the inoperative position;

FIG. 7 is a view similar to FIG. 6 illustrating the device in the operating position;

FIG. 8 is a somewhat exploded perspective view illustrating the construction of the device shown in FIGS. 6 and 7;

FIG. 9 is a sectional view taken on the line IX—IX of FIG. 6;

FIG. 10 is a front elevational view of means for automatically restoring the film stripper pawl and threader;

FIG. 11 is a front elevation view of a clutch included in the operating mechanism for the automatic film feed device, illustrating the clutch in the engaged position; and FIG. 12 is a view similar to FIG. 11 illustrating the clutch as moved to the disengaged position rendering the film feed device inoperative.

DESCRIPTION OF THE PREFERRED EMBODIMENT

Referring to FIGS. 1 and 2, a projector body or housing 1 includes a light source 2, a film pressing plate 3 and a projection lens housing 4. In FIG. 1, a film cartridge 5 is mounted in housing 1, and is suitably attached to a cartridge attaching portion 1a of housing 1 by inserting, into a central opening 5a of cartridge 5, a film feed spindle 7 mounted on a reel support arm 6 positioned in the cartridge attaching portion 1a and disposed in a retracted position. A film F paid out from cartridge 5 is formed into a loop by a film feed roller 8, and is then inserted between light source 2 and pressing plate 5, and is finally wound onto a film take-up reel which has not been illustrated.

Reel support arm 6 contains mechanism for rotating spindle 7 in the reverse or rewind direction, and this mechanism comprises a gear 9, on spindle 7, intermediate gears 10, 11, 12 and 13, and a gear 14 connected to gear 13 through a clutch described hereinafter. Gears 9 through 13 continually mesh with each other. When reel support arm 6 is in the retracted position shown in FIG. 1, gear 14 meshes with a driving gear 15. The illustrated gearing, for rotating spindle 7 in reverse or rewind direction, is adapted to be rotated only when the film is moved in the reverse direction.

Figure 3:
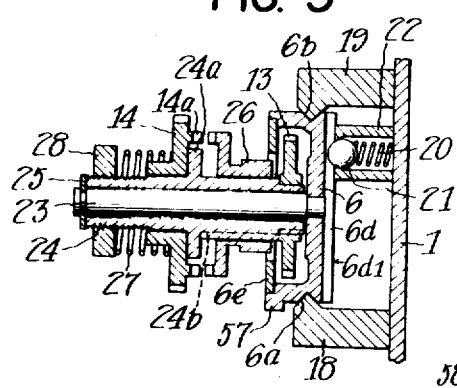
FIG. 3 is a perspective view of the reel support arm of the projector shown in FIGS. 1 and 2.

Referring to FIG. 2, an open film reel 16 is mounted on support arm 6 when the latter is in a projected or extended position, by inserting spindle 7 in a reel opening 16a. A releasable latch 7a, as shown in FIG. 3, is provided on spindle 7 to releasably lock open reel 16 in position. In the projected open film reel mounting or attaching position or support arm 6, a driving gear 17 meshes with gear 14 so the the reel 16 may be rotated in the reverse or rewind direction by gear 17.

Referring to FIG. 3, support arm 6 has its opposite edges formed with V-shaped grooves 6a and 6b, and is inserted in an opening 1b formed in the upper surface of the attaching portion 1a of projector housing 1. Guides 18 and 19, shown in FIG. 5, are provided on an inner wall of housing 1 and engage in grooves 6a and 6b, respectively, to support reel support arm 6 for vertical reciprocation between its retracted and projected positions.

Figure 4:
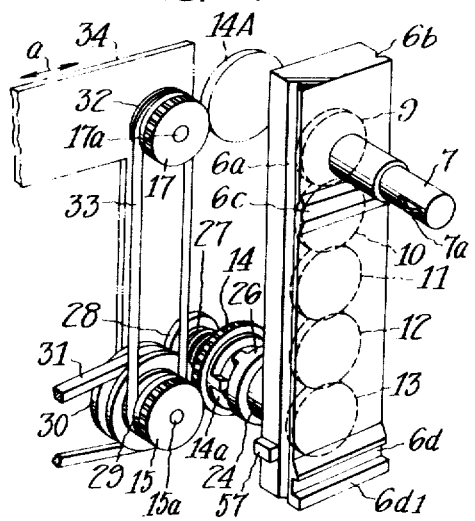
FIG. 4 is a perspective view of the mechanism for rotating the film feed spindle on the support arm in the reverse direction.

Engaging portions 6c and 6d, as best seen in FIG. 4, are formed in the upper and lower portions, respectively, of one surface of support arm 6, to effect click stopping of support arm 6 in either of its two positions. A ball 21, as best seen in FIG. 5, is biased by a spring 20 to engage portion 6c when support arm 6 is in its retracted position, and to engage portion 6d when support arm 6 is in its projected position to click stop the support arm in either of its two positions.

Engaging portion 6d of support arm 6 is formed with a ledge 6d1 in its lower edge, as best seen in FIG. 4, and this ledge is adapted to engage a suitable stop (not shown) on the inner wall of housing 1 when arm 6 is moved to its projected position to prevent complete withdrawal of arm 6 from housing 1. Ball 21 is housed in a cylinder 22 having a forward end portion which is narrowed inwardly to restrict the degree of forward movement of ball 21, under the bias of spring 20, so that ball 21 will not engage the surface of support arm 6 and rub against this surface when arm 6 is moved between its extended and retracted positions.

Figure 5:
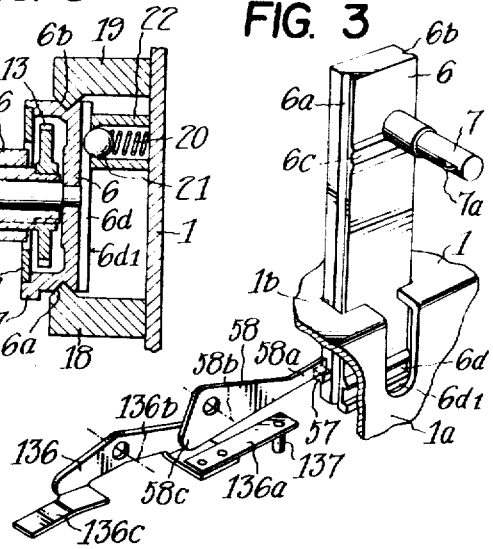
FIG. 5 is a horizontal sectional view of the lower structure of the reel support arm.

Referring more particularly to FIG. 5, a shaft 23 is connected to the inner surface of the lower portion of arm 6, and extends through a cover plate 6e into the interior of housing 1. A sleeve 24 is rotatably fitted over shaft 23 and is formed with a flange 24a, sleeve 24 being retained against axial displacement from shaft 23 by an E-ring 25 engageable in a peripheral groove in shaft 23. A key 24b is provided in that portion of sleeve 24 which is nearer its base than is the flange 24a, or to the right in FIG. 5, and a clutch member 26 is slidably mounted on this portion of sleeve 24 to rotate with the sleeve as a unit by virtue of the key 24b, while being axially displaceable along sleeve 24.

Gear 13 is secured to that portion of sleeve 24 which is disposed in support arm 6, and gear 14 is loosely mounted on a portion of sleeve 24 nearer to its forward end then to flange 24a. A spring 27 embraces sleeve 24 between gear 14 and a stop nut 28 threaded on the forward end of sleeve 24, to bias gear 14 towards flange 24a so that an end face of gear 14 is maintained in frictional engagement with a surface of flange 24a. That end surface of gear 14 facing clutch member 26 is formed with clutch means 14a to engage clutch member 26.

When reel support arm 6 is brought to the retracted, cartridge-attaching position shown in FIG. 1, gear 14 is brought into engagement with driving gear 15, mounted in housing 1, as shown in FIG. 4. Pulleys 29 and 30, which are integral with each other, are fixed on a shaft 15a secured to driving gear 15, and an endless belt 31 trained about pulley 30 is connected to a driving means (not shown). On the other hand, when support arm 6 is brought to its extended, open film reel-attaching position as shown in FIG. 2, gear 14 is moved to the dash-and-dot line position 14A of FIG. 4, in which it is brought into engagement with gear 17 mounted in body 1. A pulley 32 is integral and coaxial with gear 17 on a shaft 17a, and an endless belt 33 is trained about pulleys 32 and 29. When the film is moved in the normal direction for projection, gear 15 is displaced or disengaged from gear 14, that is, gears 15 and 17 are rotatably mounted on a support 34 movable with respect to the projector as indicated by arrow a. Thus, gear 14 is brought into meshing engagement with gear 15 or gear 17 only when the film is to be moved in the reverse or rewind direction.

When the film is to be moved in the reverse or rewind direction, clutch member 26 is slid, manually or otherwise, along sleeve 24 toward clutch portion 14a of gear 14 to engage the latter, so that film feed spindle 7 may be rotated in the reverse direction by the driving means of the projector. It is thus possible to rotate spindle 7 in the reverse direction irrespective of whether support arm 6 is in its cartridge-attaching position or in its open reel-attaching position. It will be understood that other suitable connecting means, such as one using a friction wheel and relying on frictional connection, may be used in place of the clutch means shown and described.

Referring to FIG. 6, a film stripper pawl 104 is mounted adjacent one side of a film feed port 5b of cartridge 5. A film threader 110, comprising pulleys 106, 107 and 108 rotatably mounted in support plates 105 and 132, and a round belt 109 trained about these pulleys, is mounted below port 5b. The manner of operation of stripper pawl 104 and threader 110, when cartridge 5 is attached to portion 1a of the projector housing, will be explained below.

Stripper pawl 104 is connected, through a slot 1c formed in a side wall of projector 1, to a support arm 111 which is secured to an end of a pawl operating shaft 111a on which is secured a pulley 112 connected by an endless belt 113 to a pulley 114. Slot 1c is a circular arc centered on shaft 111a. A threader operating shaft 106a to which pulley 106 is secured is maintained in frictional engagement with support plates 105 and 132 and connected, through a pulley 116 and an endless belt 117, to a pulley 115, as shown in FIG. 8, and which is integral and coaxial with pulley 114.

Pulleys 114 and 115 are adapted to be rotated in the direction of arrow b by a driving shaft, described hereinafter, which begins to rotate responsive to operation of a starting button (not shown) of projector 1. Upon rotation of pulleys 114 and 115, stripper pawl 104 pivots counterclockwise about shaft 111a, mounting support arm 111 of pawl 104, so that a forward end 104a of pawl 104 is brought into engagement with the outer peripheral surface of the roll of film F in cartridge 5. Also, support plates 105 and 132 pivot counterclockwise about the axis of shaft 106a so that belt 109 is brought into engagement with the outer peripheral surface of the roll of film F in cartridge 5.

FIG. 7 illustrates pawl 104 and threader 110 in the operative positions described above and in which belt 109, moving in the direction of arrow c while pressed against the outer peripheral surface of the roll of film F in cartridge 5, moves a leading end portion F1 of film F, separated from the roll by the forward end 104a of pawl 104, and delivers the same toward a portion of the film pressing plate 3, or a film gate, through the agency of film feed roller 8 (FIG. 1). If the leading end portion F1 is introduced into the film gate, then a detection member 142, shown in FIG. 8 and subsequently to be described, is actuated to disconnect pulleys 114 and 115 from the driving shaft and cause them to stop rotating. This restores pawl 104 and threader 110 to their original positions as shown in FIG. 6, and thereafter film F is moved intermittently by film pull-down claws (not shown). An automatic film feed device capable of performing this operation will be described below.

As shown in FIG. 8, stripper pawl 104 has a cylindrical hub 104b rotatably mounted on a minor diameter portion of a shaft 118 having a major diameter portion 118a received loosely in slot 1c and secured to the free end of support arm 111. A spring 119 embraces shaft portion 118a and hub 104b, to bias pawl 104 to pivot clockwise, as viewed in FIG. 6, about shaft 118. Such pivoting of pawl 104 is restricted by a suitable stop (not shown) provided on arm 111, so that the stripper pawl can be maintained in a suitably inclined position.

Support arm 111 is secured to operating shaft 111a which is rotatably journalled by a bearing 121 secured to a support plate 120, as best seen in FIG. 9. Pulley 112 is secured to the inner end of bearing 121, and carries an engaging pin 112a which is maintained in engagement with a cutout 123a of a friction wheel 123, loosely mounted on shaft 111a through the medium of a flange 122 secured to the shaft. A nut 125 is threadedly secured on shaft 111a and engages a spring 124 embracing the shaft and which biases wheel 123 and flange 122 into frictional engagement with each other.

As been seen in FIG. 9, pulleys 114 and 115 are formed integrally with each other and rotatably supported by a sleeve 127 fitting loosely over a shaft 126 secured to support plate 120. A driving pulley 128 has a cylindrical hub 128a rotatably mounted on the inner end portion of shaft 126, and a clutch ring 129, mounted on hub 128a, is rotatable with this hub through the medium of a key 129a while being axially displaceable along hub 128a. Clutch ring 129 is positioned to engage a clutch portion 115a on an end face of pulley 115, and is normally biased into engagement with portion 115a by a spring 129b embracing hub 128a between clutch 129 and pulley 128.

A gear 50 is loosely mounted on sleeve 127, and a stop ring 52 is threadedly secured to sleeve 127 in engagement with a plate spring 51 which biases gear 50 into frictional engagement with pulley 114. A gear 53, rotatably supported by a shaft 53a on support plate 120, meshes with gear 50, and a spiral spring 54, on shaft 53a, has one end connected to gear 50 and its other end connected to a pin 55 on support plate 120. Gear 50 is adapted to rotate clockwise, as viewed in FIG. 5, about shaft 53a when the resilient force stored in spiral spring 54 is released. The range of rotation of gear 53 is restricted by an engaging member 56, secured to an end face of gear 53, abutting pin 55. When member 56 engages pin 55, shaft 111a mounting support arm 111 is rendered inoperative because the major diameter portion 118a of shaft 118, secured to support arm 111, is pressed against the upper end edge of slot 1c, whereby stripper pawl 104 is brought to an inoperative position as shown in FIG. 6.

Pulley 106 of threader 110 is secured to rotate with a threader operating shaft 106a through the medium of a key, as shown in FIG. 9. Support plate 105 is loosely mounted adjacent the outer face of pulley 106 and retained on shaft 106a by an E-ring 131. Support plate 132 is loosely mounted on the hub of pulley 106, and a spring 134, embracing this hub between plate 132 and a flange 133 secured to the hub, biases support plate 132 to frictionally engage a surface of pulley 106. Pulley 116 is secured to the inner end of shaft 106a, which latter is journalled in a bearing 135 secured to support plate 120, and pulley 116 is connected to pulley 115 by the belt 117.

Support plates 105 and 132 of threader 110 rotatably support shafts 107a and 108a of the respective pulleys 107 and 108 shown in FIG. 6. Also, circular cross-section belt 109 is trained about pulleys 106, 107 and 108. Support plates 105 and 132 are designed so that their upper end edges are disposed at a level below the outer edge of belt 109, as shown in FIG. 6, so that the outer edge of belt 109 can press against the peripheral surface of the roll of film F exposed through opening 5b. When threader operating shaft 106a is inoperative, threader 110 is moved away from the peripheral surface of the roll of film F, as shown in FIG. 6, and a suitable stop (not shown) is provided for limiting the downward movement of threader 110.

The peripheral surface of clutch ring 129 is formed with a rib 129c which is inclined with respect to the generating lines of ring 129, and a pin 137, secured on the end of a resilient plate 136a secured to a lever 136, is positioned adjacent the outer peripheral surface of ring 129. Lever 136 is secured to a shaft 136b mounted on a stationary member, and is biased to pivot by a spring (not shown) in a counterclockwise direction about shaft 136b, as viewed in FIG. 8. Thus, pin 137 normally is disengaged from clutch ring 129 which is then engaged with pulley 115. A circular cross-section belt 138 is trained about pulley 128, and is connected to a main shutter shaft (not shown). Belt 138 is adapted to move in the direction of arrow d of FIG. 8, so that its movement is transmitted to pulley 128, clutch ring 129, and pulleys 115 and 114, in the indicated order, when clutch ring 129 is engaged with pulley 115. Thus all the pulleys rotate in the same direction, or in the direction of the arrow b of FIG. 8.

If lever 136 is pivoted clockwise about shaft 136b in FIG. 8, pin 137 is moved downwardly into the broken line position 137A of FIG. 11, in which it is positioned against the peripheral surface of clutch ring 129. In this position, a side surface of rib 129c is brought into rubbing engagement with pin 137. Rib 129c is designed so that it rubs against pin 137 when clutch ring 129 rotates in the direction of arrow b, so as to move ring 129 away from clutch portion 115a of pulley 115 and against the bias of spring 129b. When pin 137 is released from engagement with rib 129c, it is also released from engagement with the peripheral surface of ring 129 and brought into engagement with a side surface thereof so as to maintain clutch ring 129 disengaged from clutch portion 115a of pulley 115, as shown in FIG. 12.

When clutch ring 129 rotates in a direction opposite to arrow b, pin 137 is positioned against that side of rib 129c which is opposite to the side thereof engaged in the position shown in FIG. 11. This opposite wall or side surface of rib 129c is believed, so that pin 137 rides over rib 129c, assisted by the resilient plate 136a, whenever rib 129c is brought into engagement therewith during rotation of ring 129. Thus, clutch ring 129 remains engaged with pulley 115. Pin 137 and lever 136, as well as a lever 58 and a projection 57 on support arm 6, as shown in FIG. 3 and described hereinafter, constitute a clutch control mechanism for maintaining clutch ring 129 and pulley 115 disengaged. It will be understood that the clutch means shown and described may be replaced by other means, such as a clutch means operated by a shifter. In this latter case, the clutch control mechanism may be designed accordingly to serve best the purpose for which it is intended.

When pulley 112 rotates in the direction of the arrow b in FIG. 8, such rotation is transmitted through pin 112a, friction wheel 123, flange 122 and operating shaft 111a to rotate support arm 111 counterclockwise, as viewed in FIGS. 6 and 8, about the axis of shaft 111a. Thus, portion 118a of shaft 118 moves in the same direction along slot 1c, and stripper pawl 104 is thus swung in a counterclockwise direction. The counterclockwise pivoting of arm 111 is arrested when portion 118a of shaft 118 engages the lower end edge of slot 1c. Since flange 122 and friction wheel 123 are frictionally engaged with each other, the excess driving force, otherwise exerted on support arm 111, is absorbed by the frictional engagement, so that support arm 111 is held in the position of FIG. 7. When support arm 111 is in a position in which portion 118a of shaft 118 is positioned against the lower end edge of slot 1c, of forward end 104a of stripper pawl 104 presses against the peripheral surface of the roll of film F, as shown in FIG. 7.

Correspondingly, when pulley 116 rotates in the direction of arrow b of FIG. 8, its rotation is transmitted to threader operating shaft 106a so that pulley 106 begins to rotate and, at the same time, support plates 105 and 132, which are frictionally engaged with pulley 106, pivot counterclockwise about the axis of shaft 106a. This brings belt 109 into engagement with the peripheral surface of the roll of film F while belt 109 moves in the direction of the arrow c as shown in FIG. 7. With belt 109 pressed against the peripheral surface of the roll of film F, a slip occurs between support plates 105, 132 and pulley 106, and the excess driving force, otherwise exerted by pulley 106 on the support plates, is absorbed. Consequently, plates 105 and 132 are maintained in a position in which belt 109 is pressed against the roll of film F, as shown in FIG. 7. Stripper pawl 104 is brought into engagement with the roll of film F slightly earlier than is threader 110. Thus, belt 109, moving in the direction of the arrow c, presses against the peripheral surface of the roll of film F slightly after the forward end 104a of striper pawl 104 comes into engagement with such peripheral surface, as shown in FIG. 7, so that film F is rotated in the direction of arrow e shown in FIG. 7. When the film roll begins to rotate, the leading end portion F1 of film F is stripped from the roll by the forward end 104a of pawl 104, and moved, by belt 109, downwardly to the left as shown in FIG. 7. During this movement, the leading end portion F1 passes between the lower edge of pawl 104 and belt 109. Pawl 104 and belt 109 are so designed that a suitable clearance can be maintained between them by varying the degree of inclination in dependence on the diameter of the roll of film F.

Referring again to FIG. 8, one arm 140b of a pivotal lever 140 pivotal on a shaft 140a abuts against the other arm 136c of lever 136 from below. A pin 140c on arm 140b is engaged in a bifurcated portion 141a of a lever 141 pivoted on a shaft 141b. Lever 141 has an arm 141c abutting against a bent portion or ear 142a of a film detector 142. Detector 142 is formed with a slot 142b having its major dimension oriented horizontally, and this slot receives a screw 143 for loosely mounting film detector 142 on one side of a film gate 103 adjacent film pressing plate 3. The side edge of the lower portion of detector 142 abuts against a stop 145. Bent portion 142a of detector 142 is biased toward film gate plate 103 by lever 136 through the levers 140 and 141, so that detector 142 is biased to pivot counterclockwise about stop 145, with this counterclockwise pivoting being restricted by slot 142b.

Film guides 142c and 142d are provided at the upper and lower marginal portions of detector 142 adjacent film gate plate 103, and a film guide plate (not shown) extends vertically on that side of film gate plate 103 opposite detector 142. The film guide plate is designed so that, when film detector 142 is in the position shown in FIG. 8, in which it is inclined, the distance between film guide 142d and the film guide plate is equal to the width of film F. Accordingly, if the leading end portion F1 of film F is introduced into the film pressing plate section, it moves film guide 142c of detector 142 in a direction opposite to the direction in which detector 142 normally is biased to move. This movement of film guide 142c causes detector 142 to pivot clockwise about stop 145, and causes bent portion 142a to push and move pivotal lever 141. Lever 141 thus pivots counterclockwise about shaft 141b, and causes, through its bifurcated portion 141a, lever 140 to pivot clockwise about shaft 140a.

During such pivotal movement, arm 140b of lever 140 pushes arm 136c of lever 136 upwardly against the force which normally urges lever 136 to move downwardly. Thus, lever 136 pivots clockwise about shaft 136b, as shown in FIG. 8, so that pin 137 is brought into engagement with the peripheral surface of clutch ring 129 and moves ring 129 away from pulley 115. This disengages pulley 115 from driving pulley 128. Pulley 115 remains operatively disconnected from driving pulley 128 while film F is disposed in film gate 103, or while film F is fed through the film gate section.

Referring to FIGS. 8 and 9, gear 50 rotates in the direction of arrow b due to its frictional engagement with pulley 114 when the latter rotates in the direction of arrow b, and this rotates gear 53 in a counterclockwise direction as viewed in FIG. 10. Gear 53 rotates until member 56 abuts pin 55 on that side of pin 55 opposite to the side engaged by member 56 in the position shown in FIG. 10. This charges spiral spring 54 to store resilient potential energy therein. When gear 53 stops rotating after charging spring 54, gear 50 also stops rotating, with the driving force exerted on gear 50 by pulley 114 being absorbed by the frictional engagement therebetween. Gears 50 and 53 remain in this state until clutch ring 129 and pulley 115 are disengaged. When they are disengaged, the resilient potential energy stored in spring 54 is released and causes gear 53 to rotate in the reverse direction, or clockwise as viewed in FIG. 10.

The clockwise rotation of gear 53 causes gear 50 to rotate in a direction opposite to the arrow b, and this rotation is transmitted to pulleys 114 and 115. Rotation of pulley 114 in a direction opposite to the direction of arrow b causes shaft 111a to rotate in the same direction through pulley 112, so that stripper pawl 104 is moved away from the roll of film F and returned to the position shown in FIG. 6. Correspondingly, upon rotation of pulley 115 in a direction opposite to arrow b, pulley 116 rotates in the same direction so that threader 110 is restored to its original position, as shown in FIG. 6, and by its own weight. Then, shaft 111a and shaft 106a both rotate in the normal direction so they do not interfere with each other.

If the leading end F1 of film F is introduced into film gate plate section 103, film detector 142 is deflected, as mentioned. Deflection of detector 142 releases clutch ring 129 from engagement with pulley 115, so that stripper pawl 104 and threader 110 are moved away from the roll of film F and returned to their inoperative positions shown in FIG. 6. Thereafter, film F moves past an aperture 146 formed in pate 103, as shown in FIG. 8, and is illuminated by a light source 147 in light source section 2 to throw pictures onto a screen (not shown) through projection lens 4. As stated, film pulldown claws (not shown) are provided near aperture 146 to move film F intermittently. The clutch means remains disengaged while film F is disposed in the film gate section, and this permits smooth rewinding of the film upon completion of projection.

To use the projector with an open film reel, support arm 6 is first brought to its projected or open reel-attaching position and an open reel is mounted on spindle 7. Projection 57, in the lower portion of the left side of reel support arm 6, engages and moves one arm 58a of lever 58 disposed in the path of movement of arm 6, when arm 6 is moved to its projected position, and retains arm 58a in its new position. Lever 58 pivots about the axis of shaft 58b, and its other arm 58c is adapted to press against resilient plate portion 136a of lever 136. As lever 136 is pressed, pin 137 is brought into engagement with the peripheral surface of clutch ring 129, so that ring 129 and pulley 115 are released from engagement with each other, in the manner described above, and pulley 115 is operatively disconnected from driving pulley 128. Pulley 115 remains in this disconnected position while reel support arm 6 is disposed in its projected or open reel-attaching position.

From the foregoing, it will be clear that, if open reel 16 is attached to the projector after support arm 6 is moved to its projected position, film stripper pawl 104 and threader 110 are both rendered inoperative. Thus the leading end portion F1 of the film F can be introduced manually and readily into the film gate through the feed roller 8.

It should be understood that the invention is not limited to the specific form of clutch control mechanism operating in conjunction with reel support arm 6 when an open reel is to be attached to the projector, as shown and described above, and that changes and modifications can be made in such clutch control mechanism within the scope of the invention, as well as in other structural features of the small movie projector.

While a specific embodiment of the invention has been shown and described in detail to illustrate the application of the principles of the invention, it will be understood that the invention may be embodied otherwise without departing from such principles.

What is claimed is:

1. A movie projector, adapted to use both a film cartridge and an open reel, comprising, in combination, a housing; a reel support arm mounted in said housing for movement between a retracted, film cartridge-attaching position and a projected open reel-mounting position, and having a film feed spindle adjacent its outer end; a film stripper pawl and a film threader cooperable with film in a cartridge attached to said support arm to feed the film automatically to a film gate; operating mechanism, including clutch means, connecting said pawl and said threader to driving means; control mechanism for said clutch means operable to control engagement of said clutch means; and means operatably associated with said control mechanism and said support arm and operable responsive to movement of said support arm to said projected reel-mounting position, to operate said control mechanism to disengage said clutch means.

2. A movie projector, as claimed in claim 1, in which said last named means comprises a projection on said support arm and a lever, included in said control mechanism, engageable by said projection and operated by the latter upon movement of said support (42) arm to said projected reel-mounting position.

3. A movie projector, as claimed in claim 1, in which said clutch means includes an axially fixed driven clutch member and a clutch ring driven by the driving means; said control mechanism including a pin cooperable with said clutch ring to disengage said clutch ring from said driven member; and a pivoted lever carrying said pin and operated by said means operatably associated with said control mechanism and said support arm.

4. A movie projector, as claimed in claim 3, including an abutment on the inner end of said support arm; and a second pivoted lever having an arm engaged by said abutment as said support arm is moved to its projected reel-mounting position, for pivoting of said second lever; said second lever having another arm engageable with said first lever to operate said pin to disengage said clutch ring from said driven clutch member.

5. A movie projector, as claimed in claim 3, including means operable, responsive to introduction of the end of a film into a film gate, to operate said lever to operate said pin to disengage said clutch ring from said clutch driven member.

* * * * *